Sept. 22, 1964   M. F. DE BOY ETAL   3,149,806
SIDE ARM CONTROLLER
Filed July 2, 1963   3 Sheets-Sheet 1

INVENTORS
MARVIN F. DE BOY
FRANK D. ROGERS
RALPH E. FLEXMAN

BY Claude Funkhouser
ATTORNEY

Sept. 22, 1964  M. F. DE BOY ETAL  3,149,806
SIDE ARM CONTROLLER

Filed July 2, 1963  3 Sheets-Sheet 3

United States Patent Office 3,149,806
Patented Sept. 22, 1964

1

3,149,806
SIDE ARM CONTROLLER
Marvin F. De Boy, Buffalo, Frank D. Rogers, Kenmore, and Ralph E. Flexman, Tonawanda, N.Y., assignors, by mesne assignments, to the United States of America as represented by the Secretary of the Navy
Filed July 2, 1963, Ser. No. 292,795
15 Claims. (Cl. 244—83)

The present invention relates generally to improvements in control systems for aircraft and spacecraft which are modernly known generically as aerospace vehicles. More particularly, the invention relates to a new and improved controller which is utilized by the pilot in aerospace vehicles.

The nature of modern flight operations often requires the pilot to fly under conditions where high "G" fields are imposed upon the aerospace vehicle, and consequently, himself. Under these extreme conditions, conventional aircraft controllers are, for the most part, inadequate. The most widely used controller has been the conventional "stick" used in the conventional aircraft. This conventional control stick requires the pilot to move the stick in the approximate direction the pilot wishes the aircraft to maneuver. The conventional stick controller provides for control of the aircraft only about the roll and pitch axes. The control of yaw in modern aircraft has been accomplished by foot control means commonly known as rudder pedals. With the development of high performance aircraft and space vehicles which leave the earth's atmosphere, it has been increasingly difficult for the pilot to control these vehicles by movements since these movements have become increasingly difficult to make because of the higher "G" forces encountered in such vehicles. For the pilot of such aerospace vehicles to make movements, which are necessary with conventional control systems to control the aerospace vehicle, much energy is exerted by him. Consequently, modern pilots can become very rapidly fatigued. Also, it becomes increasingly difficult to make accurate movements under these high "G" loads.

In the field of control devices for space vehicles and high performance aircraft, which are generically known as aerospace vehicles, it has been the practice to employ control devices which require the pilot to operate two separate control mechanisms to accomplish control about the roll, pitch, and yaw axes of the aerospace vehicle. As pointed out above, normally these control mechanisms have been the conventional stick control and the conventional rudder pedals which are controlled by the pilot's feet. When two stations of control are utilized, the pilot in actuating the respective control systems must make movements with his feet and with his hands. These two movements doubly dissipate a pilot's energy as compared to a controller which can provide control of the aerospace vehicle about all three of its axes—pitch, roll, and yaw. Indeed, such control systems for aerospace vehicles which are presently known may not be at all adequate for space flights which are now being contemplated since flights to the moon or other planets are of such a long duration that control apparatuses which require a very minimum of exertion by the pilot are required.

It is therefore the general purpose of this invention to provide an aerospace vehicle controller which embraces all of the advantages of similarly employed prior art devices and possesses none of the aforedescribed disadvantages. To attain this, the present invention contemplates a unique arrangement of components so as to provide a controller which requires the pilot to make only one input to control the attitude of the aerospace vehicle about any one of its three axes—roll, pitch, and yaw.

Accordingly, it is an object of the present invention to

2 provide an aerospace vehicle controller which will enable the pilot to cope with the control problems which arise during exposure to high "G" forces.

Another object is to provide an apparatus comprised of a minimum number of moving parts which apparatus is exceptionally rugged, economical to manufacture, and will provide one or more output signals accurately corresponding to the input thereto.

A further object of the invention is the provision of a controller capable of minimizing complex multiple control actions required of the pilot.

Still another object is to provide a controller capable of handling control inputs in three axes so as to free the feet of the pilot for other functions as may be required.

Yet another object of the present invention is the simplification of flight control stations thereby increasing usable space in an aerospace vehicle cockpit area.

Other objects and many of the attendant advantages of this invention will be readily appreciated as the same becomes better understood by reference to the following detailed description when considered in connection with the accompanying drawings wherein.

Figure 1:
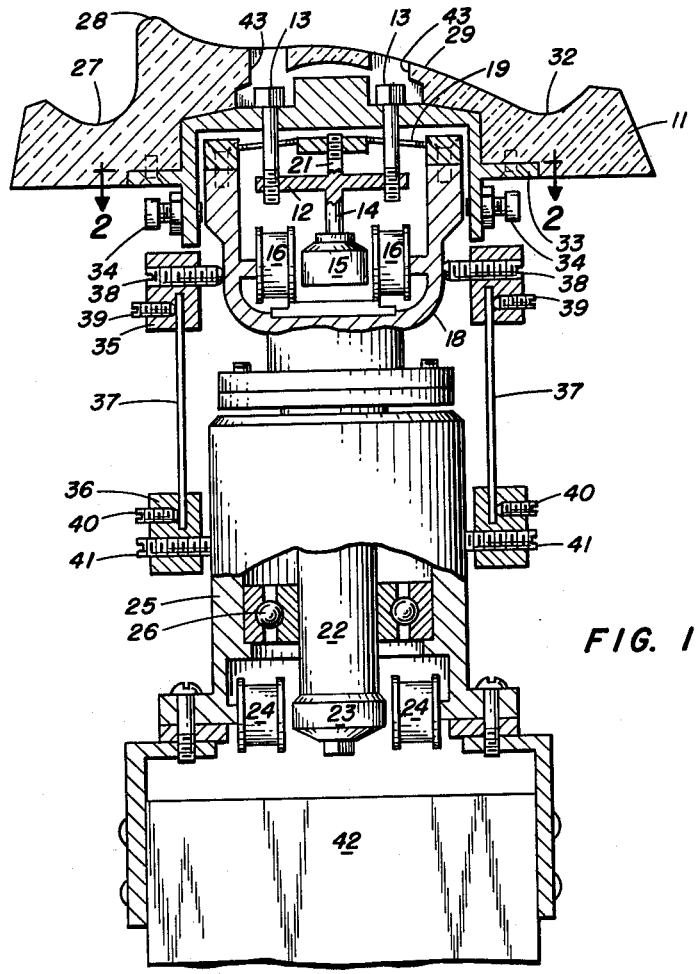
FIG. 1 is an elevational cross-sectional view of one embodiment of the present invention.

Referring now to FIG. 1, wherein is disclosed an alternative embodiment of the present invention, a controller for an aerospace vehicle is shown which provides an actuator 11. The actuator 11 comprises a pad which is formed so as to accommodate the contour of the extended palm of a human hand. The contour of the pad, or actuator, as it may be called generically, 11 provides a detent 27 which is provided to accommodate the thumb. Ridge 28 is provided so as to rest between the forefinger and thumb of a hand resting on the actuator. The pad slopes and is contoured so as to accommodate the palm between the ridge 28 and the detent 32 which accommodates the little finger. The pad 11 may be made of any material which can be formed to accommodate a hand; however, the pad 11 was found to be most satisfactory when made of light weight fiberglass.

The pad 11 is secured to a pad support member 33. The pad support member 33 accommodates null adjustment screws 13 so that the null adjustment screws cannot be moved relative to the pad support member 33 along their longitudinal axis. The embodiment of the pad as disclosed in FIG. 1 also provides access holes 43 so that a tool may be applied to the null adjustment screws 13. The null adjustment screws 13 are threadedly engaged with a rigid cross bar 12. The cross bar 12 is connected by a rigid interconnect member 21 to a cross leaf spring 19. The cross leaf spring 19 is supported by the cup shaped housing 18. Suspended into the cup shaped housing 18 from the cross bar 12 by an armature support 14 is an armature 15 and supported within the cup shaped housing 18 are stator elements 16 and 17 which operate in conjunction with the armature 15. The armature 15 and the stators 16 and 17 provide a pick-off means which is sensitive to the pitch and roll movements of the actuator 11 as will be more fully described hereinafter.

The housing 18 is supported by a shaft 22 so that the housing is freely rotatable in the support member 25. Shaft bearings 26 may be provided between the support member 25 and the shaft 22 or the shaft 22 may be journaled in support member 25 as is well known in the bearing art. At the end opposite the housing 18 of the shaft 22 is a pick-off means comprising armature 23 and stators 24 which sense the rotational movement of housing 18 and shaft 22 relative to the support member 25. The armature 23 is mounted on the end of shaft 22 and the stator elements 24 are supported by the support member 25. The support member 25 may be adapted to any manner necessary so as to be supported by the airframe 42 of the aerospace vehicle in which the controller is to be used.

The housing 18 supports, by threaded pins 38, an upper ring 35. The pad support member 33 is circular and has a flange which supports over travel stops 34 which are disposed circumferentially about the pad support member 33. The support member 25 supports a lower ring 36 by pin members 41. Interposed between the rings 35 and 36 are resilient rods 37. The threaded pins 39 and 40 secure the ends of the resilient rods 37 in the upper and lower rings 35 and 36 respectively and thereby impede relative rotation between the housing 18 and the support member 25.

In the normal operation of the embodiment of the controller as shown in FIG. 1 the pilot will be sitting in a seat in the cockpit with the forearm of his right arm strapped to a shelf or arm rest on the seat whereby his right hand will be extended with its palm down so as to rest upon the actuator 11. The forearm of the pilot is normally strapped so that he is free to move the hand about the wrist and is able to rotate his entire forearm about its longitudinal axis from the elbow. As is readily apparent by the configuration of the pad 11 the pilot may quickly remove his hand therefrom in case of an emergency. If the pilot then wishes to roll the aerospace vehicle to the left he merely applies pressure to the thumb side of the actuator 11 thereby moving slightly the armature 15 in respect to the stators 16 because of the interconnection of the armature support 14, cross bar 12, and the null adjustment screws 13. The actuator pad 11 is also free to rotate in a manner so that if the pilot desires to control the pitch attitude of the aerospace vehicle he merely exerts pressure upon the end of the actuator near either his finger tips or his wrist. This movement to control pitch moves the armature 15 with respect to the stators 17 so as to produce an output signal. The cross leaf spring member 19 serves to bias the movement of the actuator pad 11 to a neutral position but at the same time allows the actuator 11 to be rotated about any axis which is perpendicular to the axis of rotation of the housing 18, which is also the common axis of the actuator, the housing, and the support member. The null position of the pad 11 may be adjusted by turning the null adjustment screws 13. The cross leaf spring 19 while allowing the actuator 11 to be moved so as to produce roll and pitch outputs from the pick-off means 15, 16, and 17, also prevents relative rotational movement about the vertical axis between the actuator 11 and the housing 18. That is to say, any time the pilot rotates his hand so as to rotate the actuator 11 about a vertical axis, such as the axis of rotation of the housing 18, the housing 18 will also be rotated. This rotational movement of the hand will cause the armature 23 to be rotated relative to the stators 24 and thereby produce a yaw output. The rotational movement of the housing 18 is biased to a neutral position by the resilient rods 37 which are interposed between the ring members 35 and 36. To prevent overtravel of the pad 11 in the roll or pitch functions, overtravel stops 34 are provided which contact the housing 18 to prevent such overtravel. To produce roll, pitch and yaw output signals, the armatures 15 and 23 must be moved relative to their respective stators 16 and 17, and 24; however, this movement need only be very small to supply a signal, and therefore the movement of the hand and actuator 11 required to produce these signals is imperceptible to the pilot.

Figure 2:
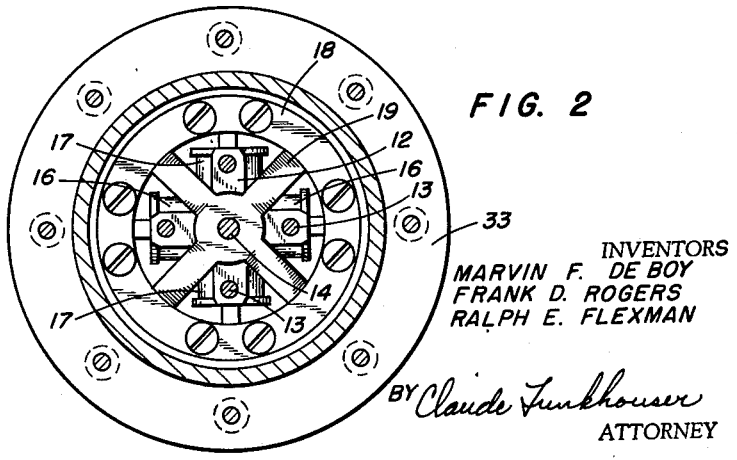
FIG. 2 is a cross-sectional view of the inner connection between the actuator and the transducer or pick-off means of the controller of FIG. 1 taken along line 2—2.

FIG. 2 discloses with more clarity the relative displacement of the cross bar 12 and the cross leaf spring 19. As is shown in FIG. 2 the cross leaf spring 19 is 45 degrees out of phase with the cross bar 12, thereby providing for the connection of the pad member 11 to the cross bar 12 by the null adjustment screws 13.

Figure 3:
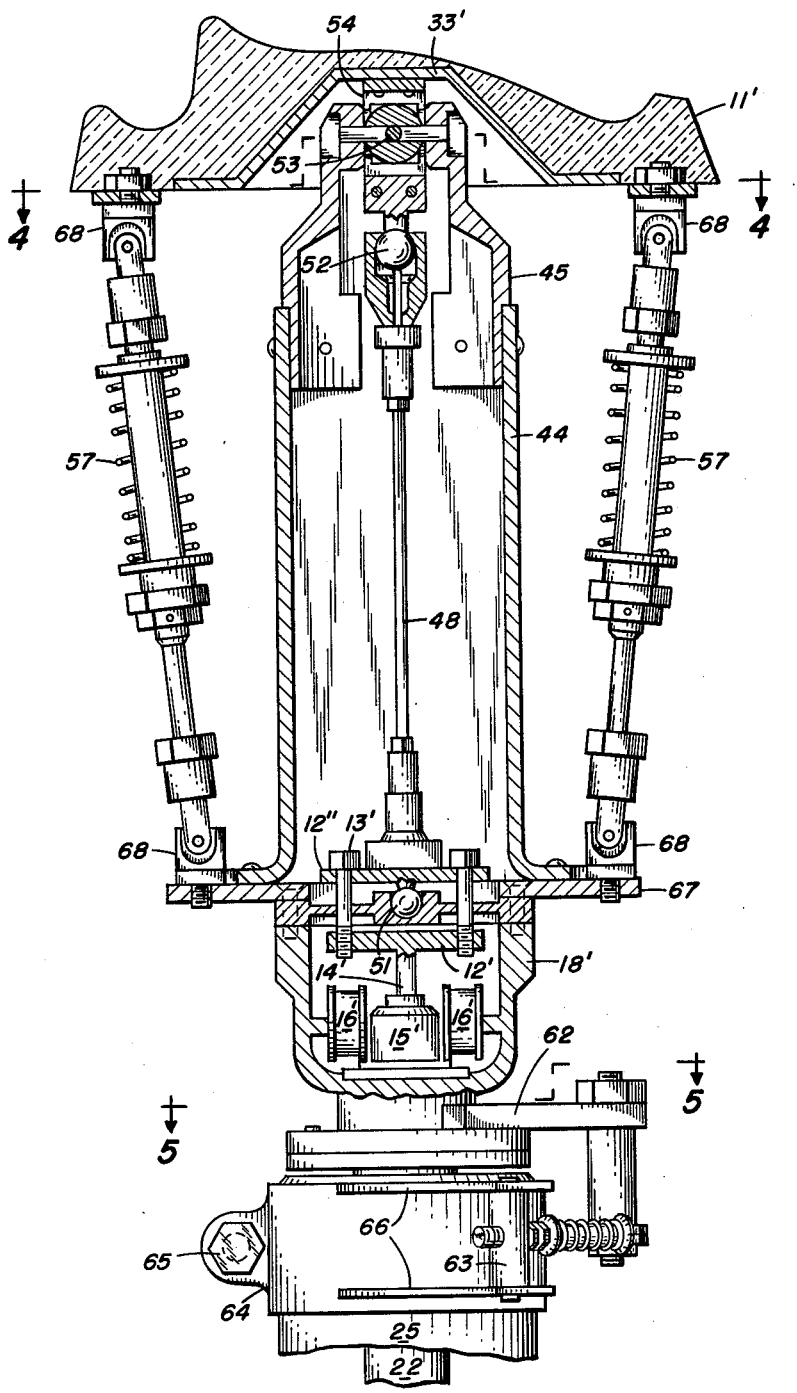
FIG. 3 is an elevational cross-sectional view of another embodiment of the present invention.
Figure 4:
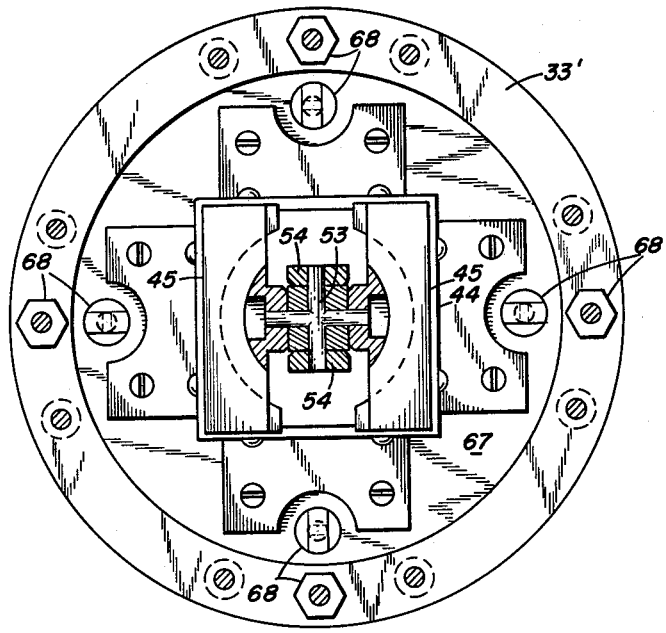
FIG. 4 is a cross-sectional view of the inner connection between the actuator and an intermediate member of the controller of FIG. 3 taken along line 4—4.
Figure 5:
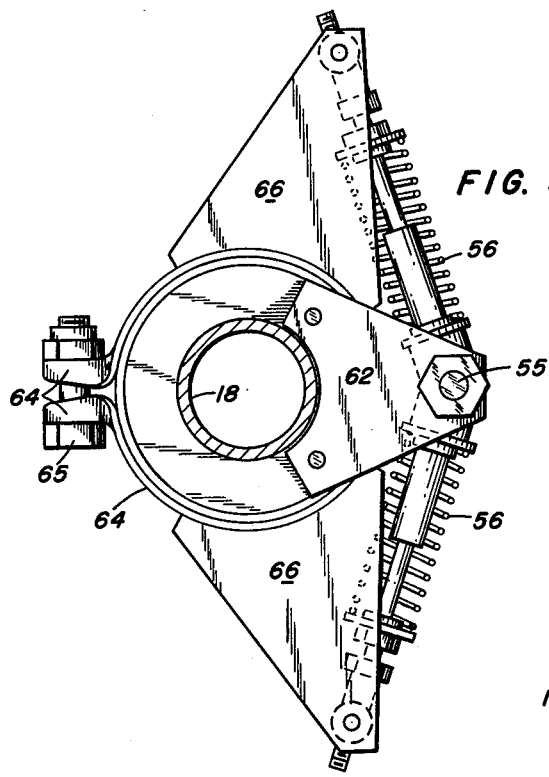
FIG. 5 is a cross-sectional view of the controller of FIG. 3 taken along line 5—5.

FIG. 3 discloses an alternative embodiment of the invention which encompasses the philosophy of the present invention. The embodiment of FIG. 3 is supported by a support member 25 which provides for a rotational support of the housing 18' in the same manner as in FIG. 1. The housing 18' is biased to a neutral rotational position by means of the plate 62, which is connected to the housing, clamping means 64–65 and the springs 56 which are disposed intermediate the plate 62 and the plates 66 which are attached to the clamp 64. These springs 56 impede the rotation of the housing 18' and hence the pad 11' against rotation about the vertical axis.

Mounted on the housing member 18' is a spring support plate 67. A secondary housing member 44 is mounted on the spring support plate 67 and supports a third housing member 45. The third housing member 45 has mounted thereon a universal joint 53 which supports the actuator 11'. The actuator 11' utilizes a support member 33' and this support member 33' has an extending portion 54 which extends around the universal joint 53 so that the pad 11' is movable about any axis which is perpendicular to the vertical axis of rotation of the housing member 18'. At the lower extremity of the extension 54 is a ball-and-socket joint 52 which connects the pad 11' to the spring rod 48. The lower end of the spring rod 48 is connected to the cross bar 12" which is in turn connected by four null adjustment screws 13' to the cross bar 12'. The cross bar 12" is connected to the housing 18' through a ball-and-socket joint 51. Suspended from the cross bar 12' by the armature support 14' is an armature 15' and supported by the housing 18' and disposed around the armature 15' are stator elements 16' and 17'. The stator elements 16' and 17' and the armature 15' form a pick-off means which is sensitive to the roll and pitch maneuvers of the actuator 11' to produce an output signal.

To maintain the pad 11' in a netural position the springs 57 are disposed at four points around the vertical axis and are attached to either end to support elements 68. The support members 68 attached the springs 57 to the spring support plate 67 and to the pad support member 33'.

The universal 53 provides for only two degrees of movement by the actuator 11' relative to the rigidly interconnected housing elements 18', 44, and 45 which are rotatable about the vertical axis due to the rotational mounting of housing 18' in support member 25. Therefore, when the pilot applies a force to the pad 11' so as to rotate it about the vertical axis to accomplish yaw control of the aerospace vehicle, the housing 18' will be rotated thereby producing a signal from the pick-off means attached to the lower end of the shaft upon which housing 18' is mounted. The application of any force by the pilot to the pad 11' about any axis perpendicular to the vertical axis will cause the pad member 11' to rotate through the universal joint 53 thereby moving the extremity of the spring rod 48 laterally in a horizontal plane because of the ball-and-socket joint 52. Movement of the pad 11' is not linear with the movement of the armature 15' because the spring rod 48 dampens out the movement. That is to say, that the degree of movement of the armature 15' will be much less than the corresponding movement of the pad 11' due to the spring rod 48. When the actuator is moved to attain a roll or pitch control, the spring rod 48 is thereby moved and causes rotation of the cross bars 12' and 12" about the ball-and-socket joint 51 to cause movement of the armature 15' with respect to the stators 16' and 17'. The armature 15' and the stators 16' and 17' comprises a pick-off means which furnishes an output signal upon movement of the pad 11' to accomplish control of the aerospace vehicle in either roll or pitch.

Figure 6:
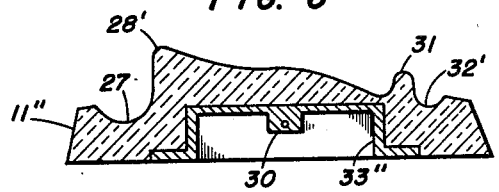
FIG. 6 is a cross-sectional view of an alternative embodiment of the controller actuator.

FIGS. 1 and 3 show two different alternative embodiments of the actuator pad 11. FIG. 6 shows yet another embodiment of the actuator pad 11. The actuator 11" in FIG. 6 differs from the actuators of FIGS. 1 and 3 primarily in that it provides a ridge 31 to rest between the little finger and the third finger of the pilot's hand. The ridge 31 provides for more equal controllability by the pilot in his actuation of the pad 11" about the roll axis. In other words, the ridge 31 equalizes the effect of the ridge 28 in that it provides an affirmative gripping means to aid in the application of roll to the left by the pilot. Roll to the left by the actuators as viewed in FIGS. 1, 3, and 6, which are for the right hand, would be counterclockwise rotation.

There is one very important feature which the actuator pads 11, 11' and 11" provide; that is, that the connection point for these pads is positioned at a point which is as close as possible to the center of gravity of the pad and hand in combination. That is to say, the point 30 about which the actuator 11' rotates or moves in respect to the housing is as close as possible to the center of gravity of the combined mass of the hand and actuator together.

As is apparent in the foregoing description, the present invention provides a controller, often called a side arm controller, for high performance aircraft and space vehicles which provides three axes control with a minimum amount of effort on the part of the pilot, which minimizes the effects of high "G" forces on the pilot's control task and is designed to be capable of accommodating the pilot's hand so that minimum effort on the part of the pilot is required to control the craft.

While the invention has been described in its preferred embodiments, it is to be understood that the terminology which has been used herein is intended to be in the nature of words of description rather than of limitation.

Obviously many modifications and variations of the present invention are possible in the light of the above teachings. It is therefore to be understood that within the scope of the appended claims the invention may be practiced otherwise than as specifically described.

What is claimed is:

1. In a space vehicle having a seat apparatus for a pilot with a forearm support, a control means positioned so as to be within grasp of the pilot's hand when the pilot's forearms is held by the seat apparatus, said control means being operable to respond to forces applied thereto about any one of three perpendicular axes whereby control of the space vehicle in pitch, roll, and yaw is maintained, the improvement comprising;
   a support means,
   a hand actuator operatively connected to said support means for rotation relative to the support means about any one of three perpendicular axes which pass through the hand actuator,
   a first pick-off means operably connected to said actuator and responsive to the force applied to said hand actuator about any axis perpendicular to the common axis of the hand actuator and the support means for supplying a first signal in accordance with the direction and magnitude of said applied force whereby the pitch and roll of the space vehicle may be controlled thereby,
   and a second pick-off means operably connected to said actuator and responsive to a second force applied to said hand actuator about the common axis of the hand actuator and support means for supplying a second signal in accordance with the direction and magnitude of said second force whereby the yaw of the space vehicle may be controlled.

2. A controller for aerospace vehicles which is responsive to forces applied about three axes comprising;
   a support means,
   a housing means rotatably mounted in said support means,
   a connection means on said housing means,
   an actuator means operatively supported by said connection means for two degrees of movement relative to said housing means,
   said connection means being disposed so as to prevent relative rotation between the actuator and the housing means about the axis of rotation of said housing means,
   and pick-off means operably associated with said housing means and said support means responsive to a force applied to said actuator for supplying a signal in accordance with the direction and magnitude of said applied force.

3. A controller for aerospace vehicles which is responsive to forces applied thereto about any one of three axes, said controller comprising;
   a support means,
   a housing means rotatably mounted in said support means,
   a connection means on said housing means,
   an actuator means operatively attached to said connection means,
   said connection means being provided for the prevention of relative rotation between the actuator and the housing means about the axis of rotation of said housing means,
   first spring means connected to the housing means and the support means for biasing the rotation of said housing to a neutral position,
   a first pick-off means operably associated with said actuator means for responding to the force applied to said actuator means about any axis perpendicular to the axis of rotation of the housing means,
   and a second pick-off means operably associated with said housing means for responding to the force applied to said actuator means about the axis of rotation of the housing means.

4. A controller for space vehicles which is responsive to forces applied about three axes comprising;
   a support means,
   a housing means rotatably supported by said support means,
   an actuator comprising a pad formed to accommodate an open palm of a hand,
   a connection means disposed on said actuator,
   said pad being operatively supported through said connection means by said housing means substantially at the center of gravity of the pad and hand,
   said connection means being provided for prevention of relative rotation between the pad and the housing means about the axis of rotation of the housing means,
   resilient means connecting the housing means and support means for impeding the rotation of said housing means,
   and pick-off means operably associated with said housing means and responsive to the force applied to said actuator about any one of the perpendicular axes of the actuator for supplying a signal in accordance with the direction and magnitude of the applied force.

5. In a combination of a control mechanism and a guidable aerospace vehicle having means for effecting the control of said vehicle;
   support means for the control mechanism attached to said aerospace vehicle,
   a housing means rotatably supported by said support means, an actuator comprising a pad formed to accommodate an open palm of a hand,
a connection means disposed on said actuator,
said pad being operatively supported through said connection means by said housing means substantially at the center of gravity of the pad and hand,
said connection means being provided for prevention of relative rotation between the pad and the housing means about the axis of rotation of the housing means,
resilient means connecting the housing means and support means for impeding the rotation of said housing means,
and pick-off means operably associated with said housing means and responsive to the force applied to said actuator about any one of the perpendicular axes of the actuator for supplying a signal in accordance with the direction and magnitude of the applied force to the aerospace vehicle control means.

6. A controller providing three-axes control in roll, pitch and yaw for a space vehicle, said controller comprising;
a support means,
a housing means rotatably mounted on said support means,
an actuator comprising a pad formed to accommodate an open palm of a hand,
said pad being operatively supported by said housing means substantially at the center of gravity of the pad and hand whereby relative rotation between the pad and the housing means about the axis of rotation of the housing means is prevented,
resilient means disposed between the housing means and support means for biasing the rotation of said housing means to a neutral position,
a first armature-stator means operably associated with said pad for responding to the force applied to said pad about any axis perpendicular to the axis of rotation of the housing means,
and a second armature-stator means operably associated with said housing means for responding to the force applied to said pad about the axis of rotation of the housing means.

7. A controller providing three-axis control in roll, pitch, and yaw for a space vehicle, said controller comprising,
a support means,
a housing member disposed for rotation about a vertical axis in said support member,
a pad formed to accommodate the open palm of a hand at an interface which is substantially perpendicular to said vertical axis of rotation of said housing means,
a connection means on said pad,
said pad being operatively supported by said housing means through said connection means substantially at the center of gravity of the pad and hand to be supported thereby,
said connection means being provided for prevention of relative rotation between said pad and said housing means about said vertical axis,
spring means interconnecting said housing means and said support means for biasing the rotation of said housing means to a neutral position whereby the rotation of said pad in the plane of said interface is likewise biased,
second spring means operatively interconnecting the pad and the housing means to bias the movement of the pad to a neutral position about any axis perpendicular to the vertical axis of rotation of said housing means,
a first armature means attacked to said pad means,
a first stator means attached to said housing means and disposed in close relationship to said first armature means whereby a signal will be produced upon the application of a force to the pad about any axis in a plane perpendicular to the vertical axis of rotation of the housing means,
a second armature means attached to said housing means, and
a second stator means attached to said support means and disposed in close relationship to said second armature means whereby a signal will be produced upon rotation of the pad about said vertical axis.

8. A controller providing three-axis control in roll, pitch, and yaw for a space vehicle, said controller comprising;
a support means,
a shaft rotatably mounted in said support means,
a cup-shaped housing mounted to one end of said shaft,
resilient means disposed intermediate the housing and support means to bias the rotation of the housing to a neutral position,
an actuator,
a connection means for support of said actuator,
said actuator being operably attached to said housing through said connection means,
said connection means being utilized to prevent relative rotation between said actuator and said housing about the axis of rotation of said housing,
a first and second pick-off means associated with said housing and support means respectively, and
said first and second pick-off means being responsive to a force applied to said actuator about any axis for supplying a signal in accordance with the direction and magnitude of said applied force whereby the motion required to produce said signal is imperceptible to a human pilot.

9. A controller providing three-axis control in roll, pitch, and yaw for a space vehicle, said controller comprising;
a support means,
a vertically disposed shaft rotatably mounted in said support means,
a housing mounted on the upper end of said shaft,
said housing forming an upwardly opening cup,
a crossed leaf spring means disposed atop said cup,
a pad formed to accommodate the downwardly facing open palm of a hand at an interface which is substantially perpendicular to the vertical axis of said shaft,
said pad being operably connected to the center of the crossed leaf spring at a point which is substantially the center of gravity of the pad and hand to be supported thereby,
a first armature suspended from the pad into the cup,
a first stator means supported within said cup and disposed around said first armature means for producing a signal when a force is applied by the hand on said pad about any axis perpendicular to the vertical axis of rotation of said shaft whereby the motion required to produce said signal is imperceptible to the human pilot,
a resilient means interposed between the housing and support means biasing the rotation of said housing to a neutral position,
a second armature means being attached to the end of said shaft opposite the end attached to the housing, and
second stator means being attached to said support means and disposed around said second armature means for producing a signal when a force is applied by the hand on said pad about the vertical axis of said shaft whereby the motion required to produce said signal is imperceptible to the human pilot.

10. In a combination of a control mechanism and a guidable aerospace vehicle having means for effecting the control of said vehicle;
support means for the control mechanism attached to said aerospace vehicle,
a vertically disposed shaft rotatably mounted in said support means, a housing mounted on the upper end of said shaft,
said housing forming an upwardly opening cup,
a crossed leaf spring means disposed atop said cup,
a pad formed to accommodate the downwardly facing open palm of a hand at an interface which is substantially perpendicular to the vertical axis of said shaft,
said pad being operably connected to the center of the crossed leaf spring at a point which is substantially the center of gravity of the pad and hand to be supported thereby,
a first armature suspended from the pad into the cup,
a first stator means supported within said cup and disposed around said first armature means for producing a signal when a force is applied by the hand on said pad about any axis perpendicular to the vertical axis of rotation of said shaft whereby the motion required to produce said signal is imperceptible to the human pilot,
resilient means interposed between the housing and support means for biasing the rotation of said housing to a neutral position,
a second armature means attached to the end of said shaft opposite the end attached to the housing, and
second stator means attached to said support means and disposed around said second armature means for producing a signal when a force is applied by the hand on said pad about the vertical axis of said shaft whereby the motion required to produce said signal is imperceptible to the human pilot.

11. A unitary three axis controller for aerospace vehicles comprising;
a hand receiving actuator,
a housing,
a first armature disposed within said housing and operatively connected to said actuator,
first stator means connected to said housing and disposed around said first armature,
a spring means interconnecting said housing and said actuator for resiliently supporting said actuator and said first armature and for preventing relative rotation between said housing, said actuator and said first armature about their common axis,
a shaft connected to said housing opposite said actuator,
a support member,
said shaft being rotatably supported by said support member,
a second armature attached to the opposite end of the shaft,
second stator means connected to the support member and disposed around the second armature means whereby when the actuator is rotated about any axis perpendicular to the common axis of the actuator, housing and first armature, said first armature is moved relative to the first stator means producing a first output from the first stator means and whereby upon rotational movement of the actuator about the common axis of the housing, actuator and first armature, said second armature is rotated in respect to said second stator means producing a second output.

12. A controller providing three-axis control in roll, pitch and yaw for a space vehicle, said controller comprising;
a support means,
a shaft rotatably mounted in said support means,
a housing mounted on one end of said shaft,
resilient means interposed between the housing and the support means to bias the rotation of said housing to a neutral position,
an actuator universally mounted to said housing whereby relative rotation about the vertical axis between said actuator and said housing is prevented, and
a first and second pick-off means operably associated with said actuator and said housing and responsive to movement of said actuator and said housing for supplying a signal in accordance with the direction and magnitude of said movement.

13. A controller providing three-axis control in roll, pitch and yaw for a space vehicle, said controller comprising;
a support means,
a shaft rotatably mounted in said support means,
a housing means mounted on a first end of said shaft,
first resilient means interposed between the housing means and the support means to bias the rotation of said housing means to a neutral position,
an actuator,
a universal joint,
said actuator being operatively connected through said universal joint to said housing means,
said universal joint being disposed for prevention of relative rotation between said actuator and said housing means about the axis of rotation of said housing means,
an extension of said actuator which extends into said housing means beyond said universal joint,
a first stator means supported within said housing means,
a first armature,
a first ball-and-socket joint,
said first armature being supported by said first ball-and-socket joint within said housing and disposed within said stator means,
a spring rod having a first end connected to said first armature,
a second ball-and-socket joint,
said spring rod being connected at the second end thereof through said second ball-and-socket joint to the extension of said actuator whereby a signal is produced upon movement of the actuator about any axis perpendicular to the axis of rotation of the housing means,
second resilient means connected to said housing for biasing the actuator to a neutral position,
a second armature attached to the second end of said shaft, and
second stator means disposed around said second armature and supported by said support means whereby upon rotational movement of said pad about the axis of rotation of the shaft a signal will be produced.

14. In a combination of a control mechanism and a guidable aerospace vehicle having means for effecting the control of said vehicle;
support means for the control mechanism attached to said aerospace vehicle,
a shaft rotatably mounted in said support means,
a housing means mounted on a first end of said shaft,
first resilient means interposed between the housing means and the support means to bias the rotation of said housing means to a neutral position,
an actuator,
a universal joint,
said actuator being operatively connected through said universal joint to said housing means,
said universal joint being disposed for prevention of relative rotation between said actuator and said housing means about the axis of rotation of said housing means,
an extension of said actuator which extends into said housing means beyond said universal joint,
a first stator means supported within said housing means,
a first armature,
a first ball-and-socket joint,
said first armature being supported by said first ball-and-socket joint within said housing and disposed within said stator means,
a spring rod having a first end connected to said first armature,
a second ball-and-socket joint, said spring rod being connected at the second end thereof through said second ball-and-socket joint to the extension of said actuator whereby a signal is produced upon movement of the actuator about any axis perpendicular to the axis of rotation of the housing means, second resilient means connected to said housing for biasing the actuator to a neutral position, a second armature attached to the second end of said shaft, and second stator means disposed around said second armature and supported by said support means whereby upon rotational movement of said pad about the axis of rotation of the shaft a signal will be produced.

15. A unitary three-axis controller for aerospace vehicles comprising;

a pad formed to accommodate the open palm of a hand, a housing, a first armature disposed within said housing and operatively connected to said pad, first stator means connected to said housing and disposed around said first armature, a universal joint operatively connecting said housing and said pad and preventing relative rotation between the housing, pad and first armature about their common axis, a shaft connected to said housing opposite the pad, a support member, said shaft being rotatably supported by said support member, a second armature attached to the opposite end of said shaft, and second stator means connected to the support member and disposed around the second armature means whereby upon rotation of the pad about any axis perpendicular to the common axis of the pad, housing and first armature said first armature is moved relative to the first stator means to produce a first output from the first stator means and whereby upon any rotational movement of the pad about the common axis of the housing, actuator and first armature said second armature is rotated with respect to said second stator means to produce a second output.

References Cited in the file of this patent
UNITED STATES PATENTS

| | | |
|---|---|---|
| 1,591,433 | Pommer | July 6, 1926 |
| 2,895,086 | Pettit | July 14, 1959 |
| 2,945,648 | Oplinger et al. | July 19, 1960 |
| 2,986,361 | Codding | May 30, 1961 |